UNITED STATES PATENT OFFICE.

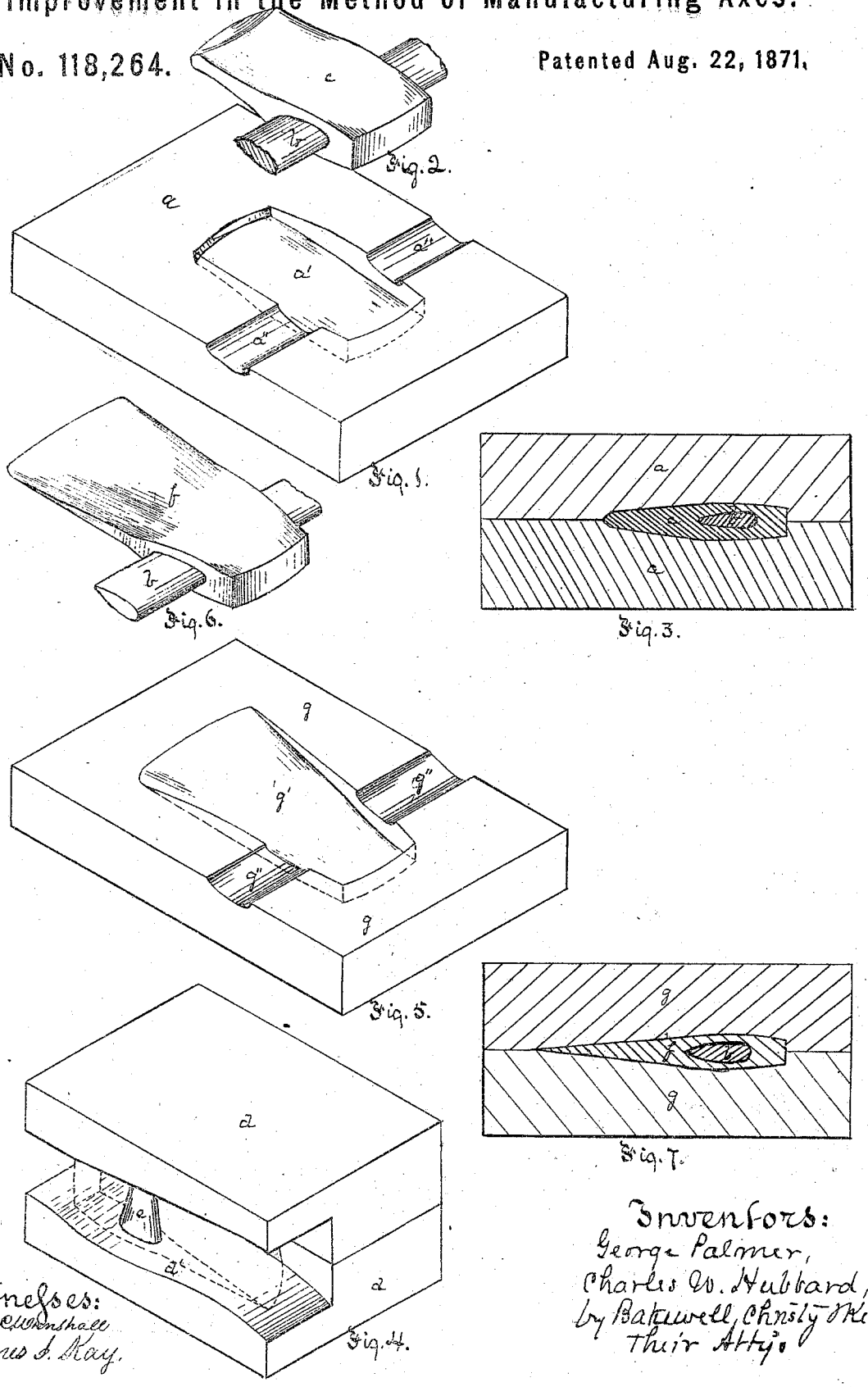

GEORGE PALMER AND CHARLES W. HUBBARD, OF PITTSBURG, PENNSYLVANIA.

IMPROVEMENT IN THE METHODS OF MANUFACTURING AXES.

Specification forming part of Letters Patent No. 118,264, dated August 22, 1871.

*To all whom it may concern:*

Be it known that we, GEORGE PALMER and CHARLES W. HUBBARD, of Pittsburg, in the county of Allegheny and State of Pennsylvania, have invented a new and useful Improvement in Manufacture of Axes; and we do hereby declare the following to be a full, clear, and exact description thereof, reference being had to the accompanying drawing making a part of this specification, in which—

Figure 1 is a perspective view of one of the dies employed in swaging and welding up the poll. Fig. 2 is a like view of the poll as formed therein. Fig. 3 is a cross-section of the pair of dies with the ax-poll inclosed therein. Fig. 4 is a perspective view of the dies which shape the ends of the ax-poll. Fig. 5 is a like view of one of the finishing-dies. Fig. 6 is a like view of the finished ax, and Fig. 7 is a cross-section of the finishing-dies with the finished ax inclosed therein.

Like letters of reference indicate like parts in each.

Axes have heretofore been made, sometimes by forging under a trip or sledge-hammer, sometimes by rolling and forging, and in some cases some parts of the ax have been brought to the desired form by suitably-shaped hammer-dies.

Our invention is designed as an improvement on all these modes of manufacture, as well as on the devices employed therein, and by it we shape the ax-poll, and edge up and shape the finished ax, employing therefor suitably-shaped matrix-dies, so as to dispense with all forging, (except to weld on the steel bit,) and also with all grinding for the purpose of shaping the ax, it being only necessary to polish it and otherwise give it an ornamental finish after it comes from the last pair of dies.

To enable others skilled in the art to make and use my invention, I will proceed to describe its construction and manner of use.

The blank from which the ax-poll is to be made is produced in any suitable way, but preferably in the mode described in Letters Patent granted to D. P. Estep, 14th October, 1856, and subsequently extended. The next operations desired are the shaping of the poll, including the eye, and the welding together of the folded parts.

To do this we make a pair of dies, $a\ a$, each the counterpart of the other, and the two having a cavity, $a'$, of the exact, or nearly exact form desired in the poll before the steel bit is welded on or in. We also make cavities $a''$ in the line of the eye of the poll, for the two ends of the eye-mandrel or eye-pin. We then insert the mandrel $b$ (which is made of proper size and form to shape the eye of the ax) into the eye of the poll, and then insert both (the poll being first heated) in the cavity $a'$ of the lower die $a$. This die we prefer to make stationary, and attach its counterpart or the upper half-die to a drop-hammer, so that it shall, by its fall, give the desired percussive blow to the poll-blank, which is thereby swaged out to fill and to the form of the cavities $a'$, whereby is produced the poll $c$, shown in Fig. 2. This operation shapes the head and eye as well as the body of the poll, and brings all parts to the exact form of the matrices, and ordinarily by a single blow, though two or more blows can be given if desired. At the same time and by the same blow the folds of the blank are welded together along their inner faces. The steel for the bit is now welded on or in, in the usual way, after which the ax is ready for the next step in the process.

To knock off the scale and shape the edge of the poll, as well as weld up any imperfections therein, we use a pair of dies, $d\ d$, of the form shown in Fig. 4, operated as already described. The shoulders $d'$ represent the working and swaging-faces of these dies, the form of the sides $d''$ of the cavity between the shoulders $d'$ not being material. The form of each shoulder should correspond to the form desired on the end of the ax to be operated on thereby. Projecting from each working-face $d'$, and in the line of the eye of the poll when in position for swaging, is a tapering die-pin, $e$, the size and form of each pin at the base corresponding to the size and form of the eye, so that by the closing of the dies the form of the eye will not be changed. The mandrel $b$ being removed, the poll $c$ is then placed with its eye on the lower stationary pin $e$, when, by a swaging percussive blow, as already described, the desired shape is given to the ends of the poll.

The ax is now again swaged, and thereby brought to the finished form, as at $f$, by means of a pair of dies, $g\ g$, of like construction and operation as the dies first described, except that the matrices $g'$ are of suitable form for inclosing the poll and bringing the bit to the form desired, with a well-defined edge. The mandrel $b$ being again inserted in the eye, the ax is put in place and the final blow given, as indicated.

The ax $f$ thus made comes from the last pair of dies well shaped, and, if the matrices are of proper form, requires no grinding to shape it, but only such as may be needed for polishing or finishing the outer surface.

This mode of manufacture is cheap, easily practiced, requires little or no skilled labor, and can be carried on with great rapidity. The same mode and like dies are applicable to the manufacture of hatchets.

What we claim as our invention, and desire to secure by Letters Patent, is—

1. The method herein described and represented of manufacturing axes and hatchets.

2. The pair of dies $a\ a$, for roughly swaging and welding the poll of the ax or hatchet, substantially as described.

3. The swaging-dies $d\ d$, having swaging-faces of suitable form for shaping, by a percussive blow, the ends of an ax, in combination with a pair of eye-pins, $e$, constructed substantially as described.

4. The series of dies $a\ a$, $d\ d$, and $g\ g$, of a construction substantially as described.

In testimony whereof we, the said GEORGE PALMER and CHARLES W. HUBBARD, have hereunto set our hands.

GEORGE PALMER.
CHARLES W. HUBBARD.

Witnesses:
   W. N. PAXTON,
   JAMES I. KAY.